June 7, 1966 D. E. LAKE 3,255,394

TRANSISTOR ELECTRODE CONNECTION

Filed June 15, 1962

INVENTOR.
Donald E. Lake
BY
Robert E. Fowler
ATTORNEY 3,255,394
TRANSISTOR ELECTRODE CONNECTION

Donald E. Lake, Kokomo, Ind., assignor to General Motors Corporation, Detroit, Mich., a corporation of Delaware Filed June 15, 1962, Ser. No. 202,808
4 Claims. (Cl. 317—234)

This invention relates to high frequency transistor construction and a method of fabricating the same.

Transistors used at high frequencies are miniature devices, small in physical size and the component parts of necessity are also small and somewhat difficult to handle. One of the problems associated with the manufacture of these devices is that of mounting the basic transistor wafer assembly on a support and making satisfactory ohmic lead connections to the various electrodes.

In the present commercial processes of connecting lead wires to the emitter and collector dots of such miniature high frequency transistors it has been the practice to use fine nickel wire leads. Such wire may be of the order of .003" diameter. Short lengths of this wire are cut and one end tinned with indium-cadmium solder. The ends are then held against the electrode dots forming the emitter and collector and the temperature raised until the wire was soldered to the dot. Following this subassembly of lead wires to the basic wafer assembly the opposite ends of the wires are then soldered to supporting terminals on a mounting base to hold the unit.

The problems introduced by the use of this type of wire lead are:

(1) Small diameter nickel wire is resilient and springy and hard to handle and may kink easily.

(2) Because of stiffness and resilience there is apt to be side pressure on the dot to which it is to be soldered when a wire end is held against a dot electrode unless the wire is held absolutely still until complete solidification. Such side pressure may cause movement of the end of the wire and in turn move the dot, shorting the transistor electrodes.

(3) Even though the dot is not moved by spring pressure in the end of the wire, the wire may move to one side of the dot in its molten state, as the dot material wets the wire the surface tension will tend to center the dot around the centerline of the wire and may short the electrode, causing a short circuit.

(4) In mounting the subassembly of transistor and nickel wire leads when the latter are soldered or welded to the supporting terminals there may be some tension introduced due to flexure of the wires. This may eventually cause tearing of the dot from the surface of the wafer.

It is an object in making this invention to provide a novel method of fabricating transistors in which no stress is introduced into the leads in any step in the assembly.

It is a further object in making this invention to provide a method of assembly of transistors in which short circuiting of elements due to unwanted movement of transverse stress is eliminated.

It is a still further object in making this invention to provide a transistor lead, mount assembly which is devoid of transverse mechanical stress in the connections.

With these and other objects in view which will become apparant as the specification proceeds, my invention will be best understood by reference to the following specification and claims and the illustrations in the accompanying drawing, in which:

Figure 1:
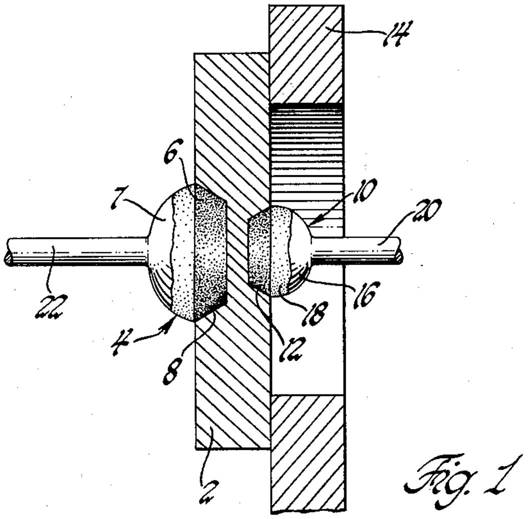
FIGURE 1 is an enlarged sectional view through a transistor wafer-lead assembly embodying my invention.

Referring now more specifically to the drawings, FIG. 1 shows in enlaged scale a semiconductor wafer 2 which may be of germanium and to which the various electrodes have been alloyed to form a basic transistor unit. On one side there is shown the collector dot 4 which has been alloyed into the surface of the garmanium to produce a re-growth P-type area 6 and an associated P-N junction barrier 8. The outer portion 7 of the collector dot will remain substantially pure indium, assuming indium was the impurity alloyed to the wafer. To the opposite face of the germanium wafer 2 there has also been alloyed in similar manner an emitter dot 10 of indium alloyed into the opposite face in substantial alignment with the collector but of smaller size and forming a converted P-type area 18 and a P-N junction 12. Surrounding the emitter dot 10 and ohmically secured to the periphery of the wafer on this same face is a base contact 14. It is to be remembered that these are very small units and that the size of the dots may be of the order of .006" in diameter and .003" in thickness. The dots are originally indium alloy and serve to contaminate the germanium to convert the same to the opposite type of conductivity characteristic but they serve no further electrical purpose after the original alloying to obtain proper penetration of impurity and re-growth.

They do, however, provide a point at which a lead may be connected. It can easily be seen that if the portion 16 of the emitter dot is moved sideways during the connection of any lead thereto that the indium will short across the barrier junction 12 between the P doped section 18 and the basic N-type crystal 2. It is, therefore, essential that in fabricating the remainder of the device the indium dots slide or move sideways to any degree. As previously mentioned it has been the practice to take a small nickel wire which has a certain amount of inherent resilience, tin one end and then while placing this end against one of the dots raise the temperature until the wire becomes imbedded in the indium rot. However, because of the resilience of the wire and the application of undesired transverse forces the listed difficulties arise. It is now suggested to use instead of a resilient wire, wire of a material having very little if any resilience or transverse strength. It is proposed to use a wire for these connections which is actually a strip of solder, said solder wire to have a melting point higher than the melting point of the indium dot per se. Therefore, wire lead 20 is of some solder alloy having a melting point higher than that of the indium dot per se. If such a short wire lead is held in contact with the indium dot and the temperature raised a eutectic material will form having a melting point lower than the melting point of either one of the individual materials. The melting point of indium, for example, is approximately 150° C. while that of tin is approximately 225° C. Assuming that the solder lead is an alloy of tin and indium, then a eutectic may form having a melting point as low as 117° C.

In fabrication, therefore, the connecting lead of either tin or tin-indium alloy is cut to the proper length and one end held against the indium dot while the temperature is raised to at least the melting points of the eutectic. The two metals fuse together and then the temperature is reduced. There is no tendency at any time, since there is no resilience in the wire, to force or push the dot from its intended location, nor is there any strength transverse to the plane of the wafer after the assembly has cooled. Lead 22 is connected to the indium dot 4 representing the collector in the same manner. It is, of course, possible to connect both these leads at the same time rather than sequentially, depending upon the desires of the operator.

Figure 2:
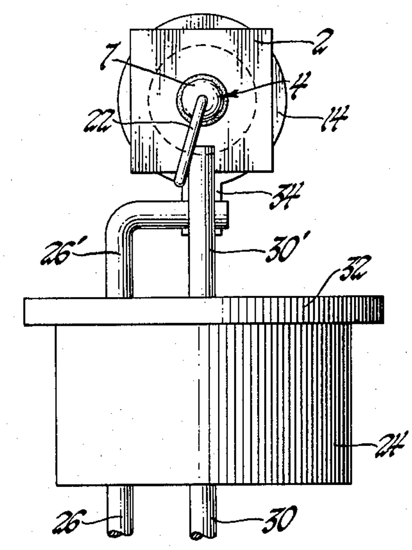
FIG. 2 is a side view of a transistor and mount of the type under consideration; and, FIG. 3 is a front view of the transistor and the mount.
Figure 3:
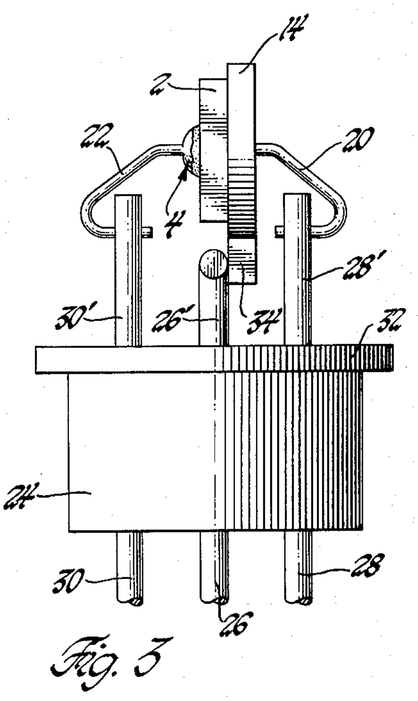

FIGS. 2 and 3 are illustrative of the basic mount to which this transistor subassembly is finally secured. The base member 24 having a series of connector prongs 26, 28 and 30 which may be an integral part of or connected to terminals supported in a horizontal plate 32, they are insulated therefrom and from each other. These terminals 30′, 26′ and 28′ extend above the upper face of the plate 32 to which a cap is secured for encapsulation. The base electrode of the transistor consists of an encircling plate 14 having an end tab 34 which is soldered or welded to the upper end of terminal 26′ in the center of the base for supporting the same. The leads 20 and 22 are then bent around as best shown in FIG. 3 until they engage the upper ends of the terminals 28′ and 30′, respectively, and are then soldered thereto. Since these solder leads have no resilience of their own they will not apply any force to the indium dots on the face of the germanium wafer.

To complete the fabrication of these small transistors a housing cap (not shown) is fitted over the whole and welded to the horizontal plate 32. The advantages of this improvement are (1) a larger diameter wire can be used for the leads on these small transistors; (2) the solder wire or strip is chosen to have very little, if any, inherent stiffness; (3) emitter or collector dots do not tend to center on the solder strip as the end next to the dot is melted or a mixture of liquid plus a solid phase is created prior to any melting per se.

What is claimed is:

1. In a transistor, a wafer of N-type germanium having indium dots alloyed to the opposite faces to form emitter and collector electrodes, one end of a tin-indium lead fused to each of the indium dots by a eutectic mixture of dot and lead metals to provide electrical connections thereto, a base member having upstanding terminal posts, said tin-indium leads being connected also to the terminal posts to support the wafer subassembly and complete electrical connections to other equipment.

2. In a method of fabricating a transistor, the steps of taking a semiconductor body having small alloyed dots on opposite faces which provide emitter and collector electrodes, cutting small leads of soft pliable electrically conductive metal having a melting point temperature above that of the material of the dots, holding one end of each of the soft metal leads in contact with the dots, heating at a temperature between the lead-dot eutectic temperature and the dot melting point temperature until the contacting ends of the leads fuse to the dots, and cooling the fused ends.

3. In a method of fabricating a transistor, the steps of taking a semiconductor body having small alloyed indium dots on opposite faces which provide emitter and collector electrodes, cutting small leads of soft pliable tin-indium alloy having a melting point temperature above that of the material of the dots, assembling one end of each of the tin-indium alloy leads in contact with the indium dots, heating the assembly at a temperature between the lead-dot eutectic temperature and the dot melting point temperature until the contacting ends fuse to the dots, cooling the fused ends, selecting a supporting base having a plurality of vertical terminal posts, and soldering the free ends of the lengths of soft metal to the posts to provide outside connections without applying transverse force to the alloy dots.

4. In a transistor, a wafer of N-type germanium having indium dots alloyed to the opposite faces to form emitter and collector electrodes, one end of a lead formed of a soft pliable electrically conductive metal having a melting point temperature above indium fused to each of the indium dots by a eutectic mixture of dot and lead metals to provide electrical connections thereto, a base member having upstanding terminal posts, said soft pliable leads being connected also to the terminal posts to support the wafer subassembly and complete electrical connections to other equipment.

References Cited by the Examiner

UNITED STATES PATENTS

| | | | |
|---|---|---|---|
| 2,327,511 | 8/1942 | Lange et al. | 317—234 |
| 2,759,133 | 8/1956 | Mueller | 317—235 |
| 2,929,885 | 3/1960 | Mueller | 317—235 X |
| 2,998,555 | 8/1961 | Klossika | 317—234 |

JAMES D. KALLAM, *Acting Primary Examiner.*

JOHN W. HUCKERT, *Examiner.*

R. F. POLISSACK, *Assistant Examiner.*